(12) United States Patent
Gerent et al.

(10) Patent No.: US 6,502,489 B2
(45) Date of Patent: Jan. 7, 2003

(54) METHOD FOR CUTTING A LAYUP OF SHEET MATERIAL

(75) Inventors: Thomas Gerent, Berlin, CT (US); Jed R. Higgins, Tolland, CT (US)

(73) Assignee: Gerber Technology, Inc., Tolland, CT (US)

( * ) Notice: Subject to any disclaimer, the term of this patent is extended or adjusted under 35 U.S.C. 154(b) by 0 days.

(21) Appl. No.: 09/909,687

(22) Filed: Jul. 20, 2001

(65) Prior Publication Data

US 2001/0045148 A1 Nov. 29, 2001

Related U.S. Application Data

(62) Division of application No. 09/579,925, filed on May 26, 2000, now abandoned.

(51) Int. Cl.⁷ .................................................. B26D 5/30
(52) U.S. Cl. .............................. 83/49; 83/76.6; 83/940; 700/134; 700/135
(58) Field of Search ................................. 83/76.6, 76.1, 83/76.9, 72, 73, 74, 75, 75.5, 936, 937, 938, 939, 940, 941, 365; 700/134, 135

(56) References Cited

U.S. PATENT DOCUMENTS

| | | | | | |
|---|---|---|---|---|---|
| 4,833,957 A | * | 5/1989 | Lundgren | ..................... | 83/282 |
| 4,853,866 A | * | 8/1989 | Andrada | ........................ | 2/901 |
| 4,901,359 A | * | 2/1990 | Bruder | .................. | 235/462.01 |
| 5,172,326 A | * | 12/1992 | Campbell et al. | ........... | 700/134 |
| 5,258,917 A | * | 11/1993 | Bruder et al. | ................ | 348/125 |
| 5,487,011 A | * | 1/1996 | Chaiken | ..................... | 356/429 |
| 5,727,433 A | * | 3/1998 | Pomerleau et al. | ......... | 700/130 |
| 5,757,950 A | * | 5/1998 | Bruder | ........................ | 382/111 |
| 5,806,390 A | * | 9/1998 | Pomerleau et al. | ......... | 700/130 |
| 5,815,398 A | * | 9/1998 | Dighe et al. | ................. | 700/171 |
| 5,831,857 A | * | 11/1998 | Clarino et al. | ........... | 178/18.01 |
| 5,867,392 A | * | 2/1999 | Bousquet | ..................... | 700/134 |
| 5,886,319 A | * | 3/1999 | Preston et al. | ......... | 219/121.72 |
| 5,953,232 A | * | 9/1999 | Blaimschein | ................ | 382/111 |
| 6,173,211 B1 | * | 1/2001 | Williams et al. | ............ | 700/131 |
| 6,178,859 B1 | * | 1/2001 | Pomerleau et al. | ........... | 83/100 |
| 6,205,370 B1 | * | 3/2001 | Blaimschein et al. | ....... | 382/111 |

FOREIGN PATENT DOCUMENTS

| | | | |
|---|---|---|---|
| EP | 0577842 A1 | * | 1/1994 |
| EP | 0950480 A2 | * | 10/1999 |
| GB | 2297682 | * | 8/1996 |

* cited by examiner

Primary Examiner—Allan N. Shoap
Assistant Examiner—Stephen Choi
(74) Attorney, Agent, or Firm—McCormick, Paulding & Huber LLP

(57) ABSTRACT

An apparatus for cutting and matching parts in a layup of material that includes a cutter tool for cutting the parts and a camera for detecting and analyzing match points located on the individual parts that need to be matched to other parts. The apparatus also includes a computer having instructions for optimizing a process for matching various parts in the layup resulting in an increase of effective usable area of the cutter table and in increased efficiency in use of material in the layup. The computer includes instructions to direct the camera to process match points that are disposed within a tool offset, defined as a distance between the cutter head and the camera, prior to advancing the layup to a takeoff end of the cutter table.

5 Claims, 4 Drawing Sheets

METHOD FOR CUTTING A LAYUP OF SHEET MATERIAL

This application is a divisional of U.S. patent application Ser. No. 09/579,925, now abandoned entitled Apparatus And Method For Cutting A Layup Of Sheet Material, filed on May 26, 2000.

BACKGROUND OF THE INVENTION

1. Technical Field

The present invention relates to an apparatus and a method for preparing parts cut from a layup of sheet material and, more particularly, to optimization of matching and cutting operations therefor.

2. Background Art

A process for fabricating cloth products from web material includes a number of steps and utilizes complicated machinery. First, the web material is spread on a spreading table by a spreading machine. The cloth is typically spread one layer at a time to form a stack or a layup having a certain width and height. The stack is then moved to a cutter table. A conventional cutter table extends in a lateral or Y-axis direction and a longitudinal or X-axis direction and has a permeable bristle surface. A cutter head is typically movably attached to a cutter beam with the cutter beam being movable along the cutter table in the X-axis direction and with the cutter head being movable with respect to the cutter beam in the Y-axis direction.

Once the layup is moved to the cutter table, parts are cut by the cutter head according to a marker or a nest that outlines the shapes of the parts. The marker can also include parts that have either the same or different shapes. However, the individual parts in each layer will have the same shape as the part in the layer above or below. The cut parts are then sewn together at a later time.

Preparation of a marker or nest typically requires that complicated and often conflicting requirements are met. For greater efficiency, it is important to minimize wasted material when nest or marker are prepared. However, to ensure high quality of the final product, certain parts have to be cut to match other parts in the layup. This becomes especially critical when material has a pattern. In that event, certain parts have to be aligned precisely with others.

The process of matching parts in a layup has been partially automated. A camera is mounted onto the cutter beam to view the material to be cut. As the camera views the material, it also analyzes the pattern and provides data for modifying the nest or marker to ensure that the necessary parts with pattern are properly aligned. In current cutter systems, the camera is mounted on the opposite side of the cutter head in order to minimize interference between the cutter head and the camera's field of view. As the camera and the cutter head are mounted on opposite sides of the cutter beam, an offset between the cutter tool and the camera is established.

The tool offset between the cutter tool and the camera presents a number of problems. One problem is that when the layup is moved onto the cutter table from the spreader table and the cutter beam is moved to the leading edge of the cutter table to start cutting operation, the camera cannot view and analyze the layup that is disposed within the tool offset between the cutter tool and the camera. Therefore, a smaller marker or nesting layout are generated such that the camera can visit all match points. Smaller marker usually results in less efficient use of material.

Another major shortcoming of the existing system is that the offset reduces usable area of the cutter table. Reduction in cutter table usable space is highly undesirable since the chance of matching all parts is reduced. If some parts that need to be matched are out of reach of the camera and the cutter head, then the cutter cannot proceed with the cutting operation. This requires an operator to manually attempt to match the necessary pieces. For the operator to successfully match various parts of the layup, the operator must be highly skilled and spend a great deal of time. The problem of fitting larger layups onto the cutter table is exacerbated by newer conveyorized tables. The conveyorized tables are much shorter than conventional cutter tables and include a much smaller conveyorized bristle surface. While the conveyorized tables save floor space in the shop and reduce size and cost of the expensive bristle surface, it is more difficult to match all the necessary pieces since much smaller layup can fit onto the table. Additionally, smaller usable area of the cutter table results in a greater number of layup to yield the same quantity of parts. This reduces efficiency of the operation.

Another drawback of the existing systems is that an origin for cutting instructions must be selected manually. Cutting data stored in a cut file requires that an origin or starting point on the layup be established. Currently, an operator must select the origin for the cutting operation to start. Typically, selection of the origin is a trial and error process that is time consuming and not always error free.

Therefore, it is desirable to reduce waste of sheet material and optimize the size of the layup that can fit and be cut on the cutter table.

It is an object of the present invention to optimize cutting and matching operations.

It is another object of the present invention to minimize waste of sheet material.

It is a further object of the present invention to optimize the size of the layup that can fit and be cut on the cutter table.

It is another object of the present invention to optimize matching of various pieces in the layup.

SUMMARY OF THE INVENTION

The present invention in one aspect is directed to a method for evaluating sheet-type work material that is carried on a cutting apparatus support surface to minimize waste. In the method, a cutting apparatus is provided that has a movable support on to which at least one layer of sheet-type work material can be placed. A camera and a cutter head are mounted to the cutting table such that the camera and cutter head can be moved to various locations above the movable support. The camera and cutter head are offset a distance relative one to the other defining an offset distance between a tip of the cutter head and a focal point of the camera. The camera's movement over the support surface defines a scanable area, and the cutter head's movement over the support surface defines a cuttable area within the scanable area. As a result of the offset distance, an ancillary area is created.

In the method, the work material is placed on the support surface. A portion of the work material is within the scanable area. The camera is then placed over the work material at a selected origin point. The camera commencing from the selected origin point then scans at least part of the portion of the work material generating a first set of data. The moveable support then relocates the work material such that at least some of the part of the work material corresponding with the first set of data is within the ancillary area. The camera then scans at least some additional work material within the cuttable area to generate a second data set. Using the first and second data sets, a cutting operation is then performed in both the cuttable area as well as the ancillary area.

According to the present invention, an apparatus for cutting and matching individual parts in a layup of material includes a cutter table extending in a longitudinal direction from a take-on end to a take-off end for supporting the layup, a conveyor belt mounted onto the cutter table for advancing the layup from the take-on end to the take-off end of the cutter table, a cutter beam movable in the longitudinal direction along the cutter table, a cutter head mounted onto the cutter beam, a camera disposed on the cutter beam at an offset from the cutter head to define a tool offset, and a computer including instructions for optimizing a process for matching various parts in the layup resulting in an increase of effective usable area of the cutter table and in increased efficiency in use of material in the layup.

The camera of the present invention is directed to process match points that are disposed within the tool offset prior to advancing the layup to the take-off end of the cutter table. The camera extracts the matching points for the parts to be matched from a data file according to the X-coordinate positions and processes those match points with X-axis values less than the tool offset prior to advancing the conveyor.

The apparatus and method of the present invention allow more efficient use of material and also increase usable area of the cutter table.

The foregoing and other advantages of the present invention become more apparent in light of the following detailed description of the exemplary embodiments thereof, as illustrated in the accompanying drawings.

DETAILED DESCRIPTION OF THE INVENTION

Figure 1:
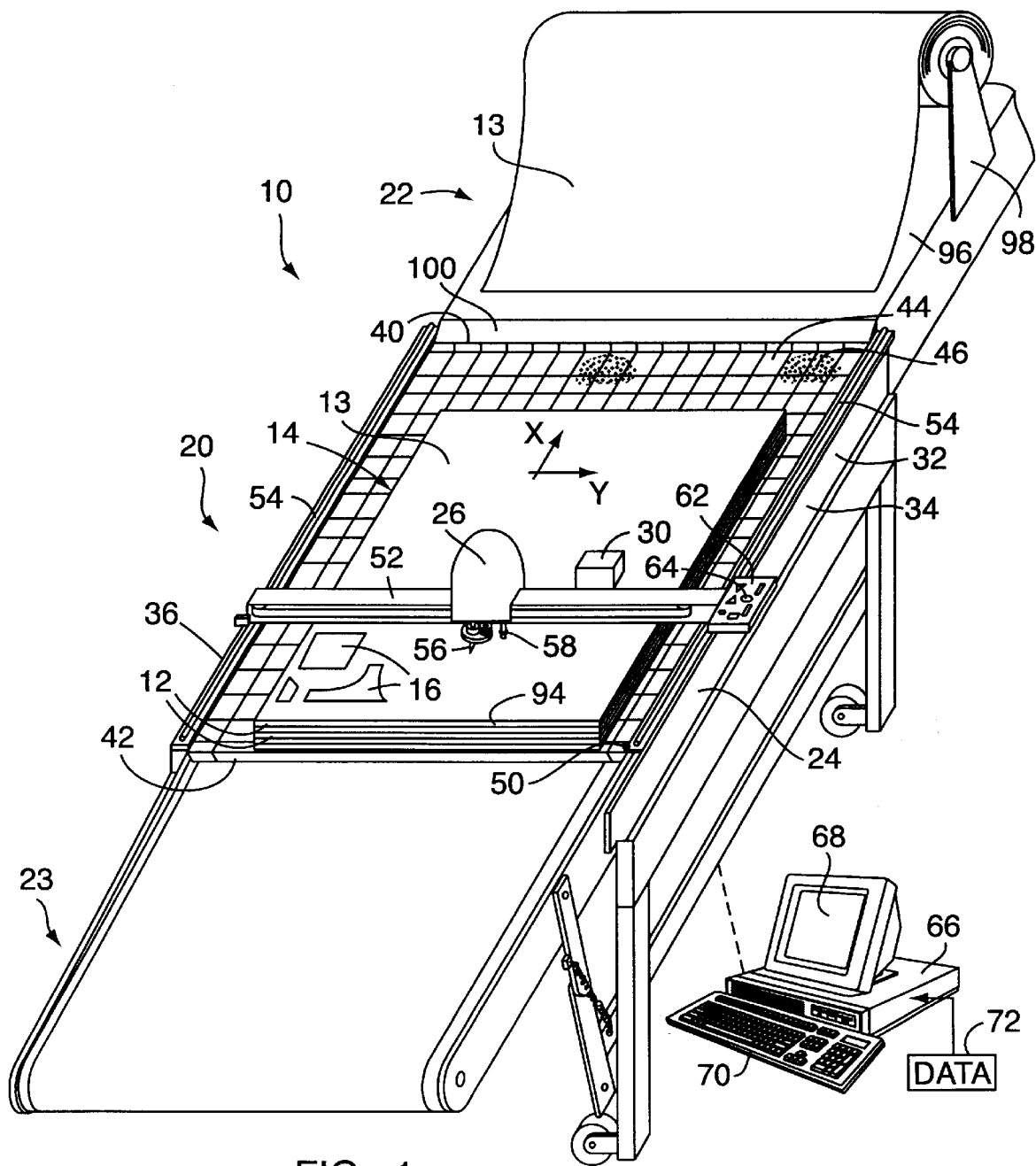
FIG. 1 is a simplified, perspective view of an apparatus for cutting a single or multiple plies of limp material including a cutting apparatus, a spreading apparatus and a take-off table.

Referring to FIG. 1, an apparatus 10 for cutting a single ply or multiple plies 12 of limp material 13, referred to as a layup 14, into individual parts 16 of predetermined size and shape includes a cutting apparatus 20, a spreading apparatus 22 and a take-off table 23. The cutting apparatus 20 includes a cutter table 24 for supporting the layup 14 and a cutter head 26 movable with respect to the cutter table 24. The cutter apparatus 10 also includes a camera 30 that is also movable with respect to the cutter table 24. The cutter table 24 includes a frame 32 and extends in a lateral, or Y-coordinate, direction from a console side 34 to a remote side 36 and in a longitudinal, or X-coordinate, direction from a take-on end 40 to a take-off end 42. The cutter table includes a conveyor 44 with a permeable bristle surface 46 that advances the layup 14 in the X-coordinate direction. An origin 50 of the cutter table 24 is defined at the take-off end 42 and console side 34 of the cutter table 24.

Figure 2:
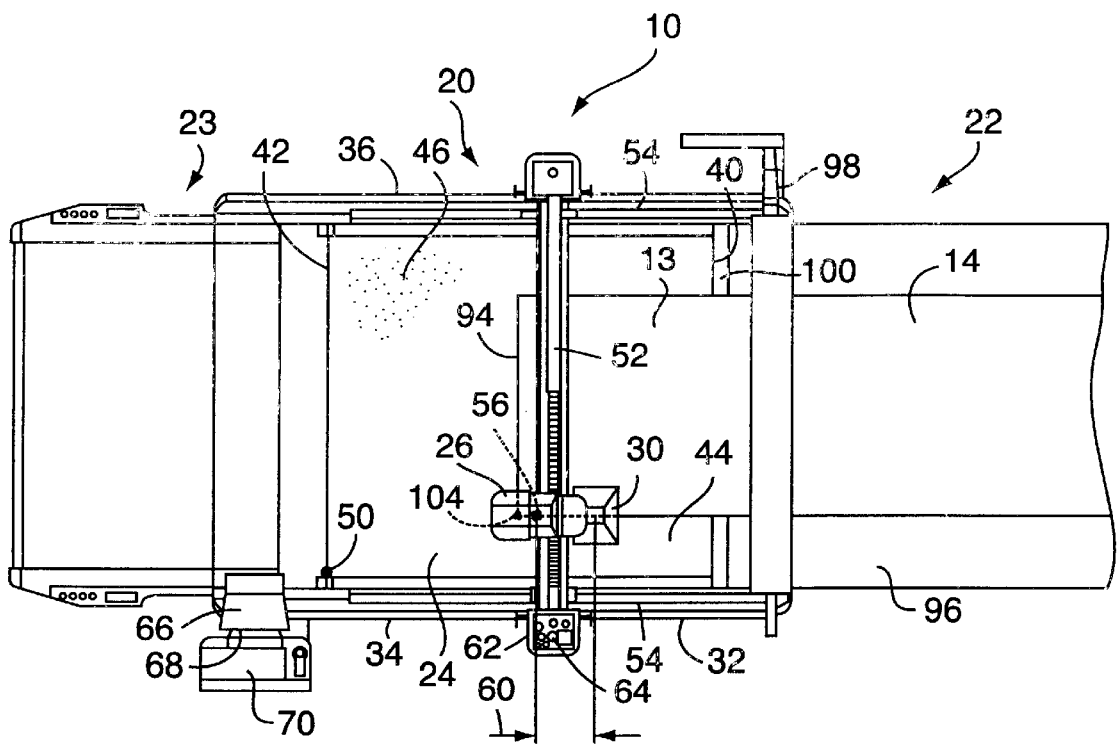
FIG. 2 is a plan view of the apparatus of FIG. 1 with the layup partially advanced onto a cutter table.

A cutter beam 52 supports the cutter head 26 and is movable in the X-coordinate direction along a pair of guide rails 54 secured to the cutter frame 32. The cutter beam also supports the camera 30 mounted on the other side of the beam 52 to avoid interference with the cutter head 26. The cutter head 26, which cuts the layup 14, and the camera 30, which scans the upper ply 12, move in the lateral or Y-coordinate direction across the cutter beam 52. A cutter tool 56 and an origin locator 58 are supported within the cutter head 26. In the preferred embodiment of the present invention, the origin locator 58 is a laser beam for identifying origin of the layup 14 for subsequent matching and cutting operations. The X-axis distance between the cutter tool 56 and the camera 30 is defined as the tool of 60, as best seen in FIG. 2. Since there is a tool offset 60, the X-Y movement of the cutter tool 56 and the camera 30 define a cuttable area that is within a scanable area.

Figure 3:
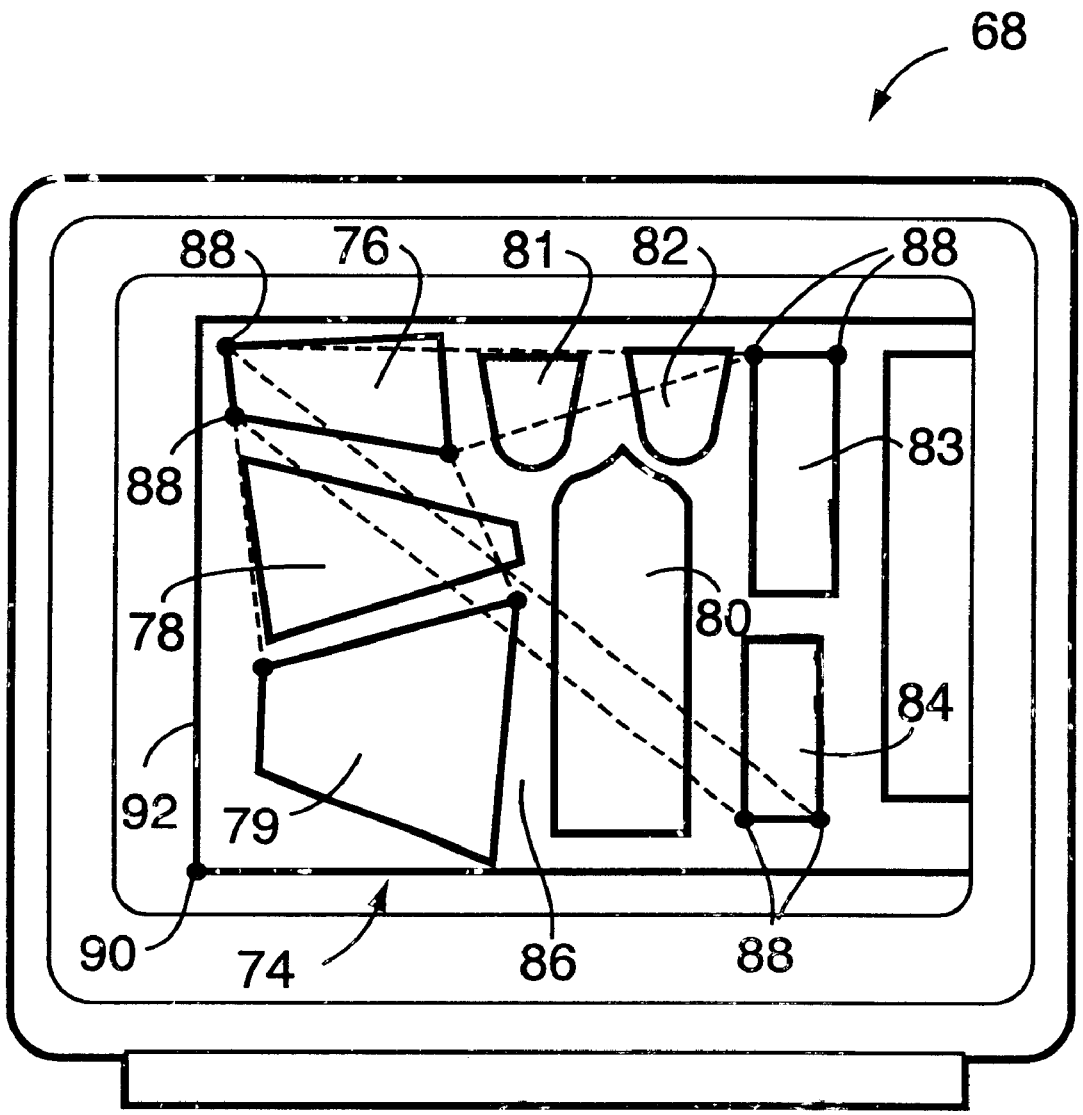
FIG. 3 is a front view of a monitor showing a marker layout for the apparatus of FIG. 2.

The cutting apparatus 20 also includes an operator control panel 62 formed substantially integrally with the beam 52 and including a plurality of function buttons. One of the plurality of function buttons is an origin button 64, as best seen in FIG. 1. The cutting apparatus 20 also includes a computer 66 with a monitor 68 and a keyboard 70 for controlling various cutting operations. The computer 66 includes data 72 such as cut data and matching data. The monitor 68 can display various information, including a marker or a nest layout 74, as shown in FIG. 3. The marker layout 74 includes an arrangement of a plurality of parts 76–84 with material disposed therebetween referred to as waste 86. The marker layout 74 also includes information regarding matching of parts to be sewn together at a later time. Some parts are referred to "major" because of their prominence in the final product and the need to match those parts to a relatively large number of other parts. For example, part 76 must be matched to parts 79, 83 and 84, as indicated by dashed lines in FIG. 3. A plurality of match points 88 on each part to be matched must be identified and matched to match points 88 on the other matching parts. The cutting and matching data file has positional instructions for cutting and matching parts based on an origin or a starting point 90 defined on the marker layout 74. Typically, the origin point 90 is defined at the leading edge 92 of the marker layout. The leading edge of the marker layout substantially coincides with a leading edge 94 of the layup 14. However, since the plies 12 of the layup 14 are not always perfectly lined up at the leading edge 94, the origin point of the layup 14 is dictated by the shortest ply.

The spreading apparatus 22 is disposed substantially adjacent to the take-on end 40 of the cutter table 24 of the cutter apparatus 20 and includes a spreader table 96 for supporting at least one layer of material 13 and a spreader 98 for facilitating spreading of the material 13, as shown in FIGS. 1 and 2. A ramp 100 is disposed between the spreader table 96 and the cutter table 24 for transitioning the layup 14 from the spreader table onto the cutter table.

The take-off table 23 is disposed at the take-off end 42 of the cutter table 24 for accommodating cut parts 16 subsequent to the cutting operation.

Figure 4:
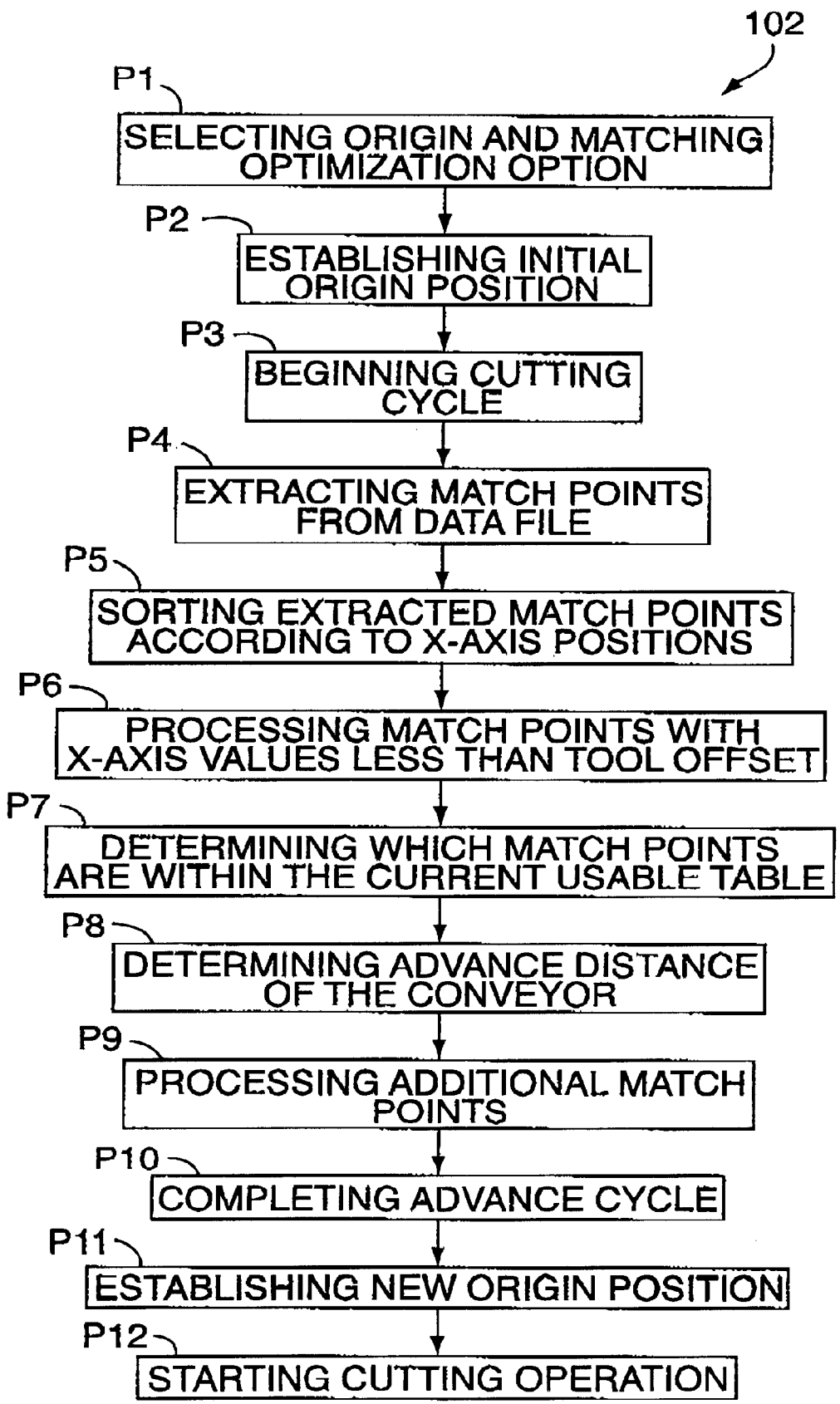
FIG. 4 is a high-level, logic flow diagram showing origin and matching optimization process for the apparatus of FIG. 1, according to present invention.

Referring to FIG. 4, the computer 68 includes instructions or program 102 for automatically optimizing matching of the parts and selecting an origin for the cut data file on the layup. In operation, the spreader 98 spreads at least one ply 12 of the material 13 onto the spreader table 96, as best seen in FIGS. 1 and 2. Typically, a plurality of plies 12 are spread to form the stack or layup 14. The leading edge 94 of the stack is then moved onto the cutter table 24 over the ramp 100, such that the leading edge 94 of the layup is disposed on the conveyor surface 44 and is within the field of view of the camera 30. The operator then selects origin and matching optimization option through the computer 66 (or the operator panel 62), as indicated by P1 in FIG. 4. The operator subsequently establishes an initial origin point 104 on the layup, as indicated by P2, and shown in FIG. 2. Since not all the plies 12 are perfectly aligned at the leading edge 94 of the layup 14, the shortest ply dictates the origin point 104 of the layup. The operator establishes the origin 104 by visually identifying the shortest ply and pointing the origin locator 58 onto the origin 104 and activating the origin button 64 disposed on the operator control panel 62, as shown in FIG. 1. Once the operator inputs the initial origin coordinates into the computer 66, the automated cutting cycle begins, as indicated by P3.

All the match points 88 from the cutting and matching data file are extracted, as indicated by P4 and shown in FIG. 3. These match points 88 are then sorted according to their X-coordinate position, as indicated by P5. The match points with the X-coordinate values less than tool offset 60 are processed first, as indicated by P6. The camera 30 visits those match points 88 and collects data therefrom. Then, it is determined which of the match points that fall within the tool offset 60 are currently on the cutter table, as indicated by P7. Subsequently, it is determined how much does the conveyor 44 need to be advanced for all the match points disposed within the tool offset 60 to be located on the cutter table 24, as indicated by P8. These additional match points are then processed, as indicated by P9. To process these additional match points, the layup 14 is advanced and the camera 30 visits these additional match points. The last three steps P7, P8 and P9 are performed only if the cutter beam 52 and the camera 30 are disposed in close proximity to the take-on end 40 of the cutter table 24 and only a small portion of the layup 14 is initially positioned on the cutter table 24. This can be done when the initial origin 104 is established by using means other than the origin locator 58 of the cutter head 26. In the preferred embodiment described above, with the origin locator 58 establishing the initial origin 104, the leading edge 94 of the layup 14 is initially advanced at least the amount of the tool offset 60 for the origin locator 58 to access the leading edge 94 of the layup 14. Therefore, steps P7–P9 do not need to be performed in the currently preferred embodiment of the present invention. The steps P7–P9 are performed in an alternate embodiment when other means for establishing the initial origin 104 are used. Such other means can be a digitized pointer, not integral to the cutter head.

Figure 5:
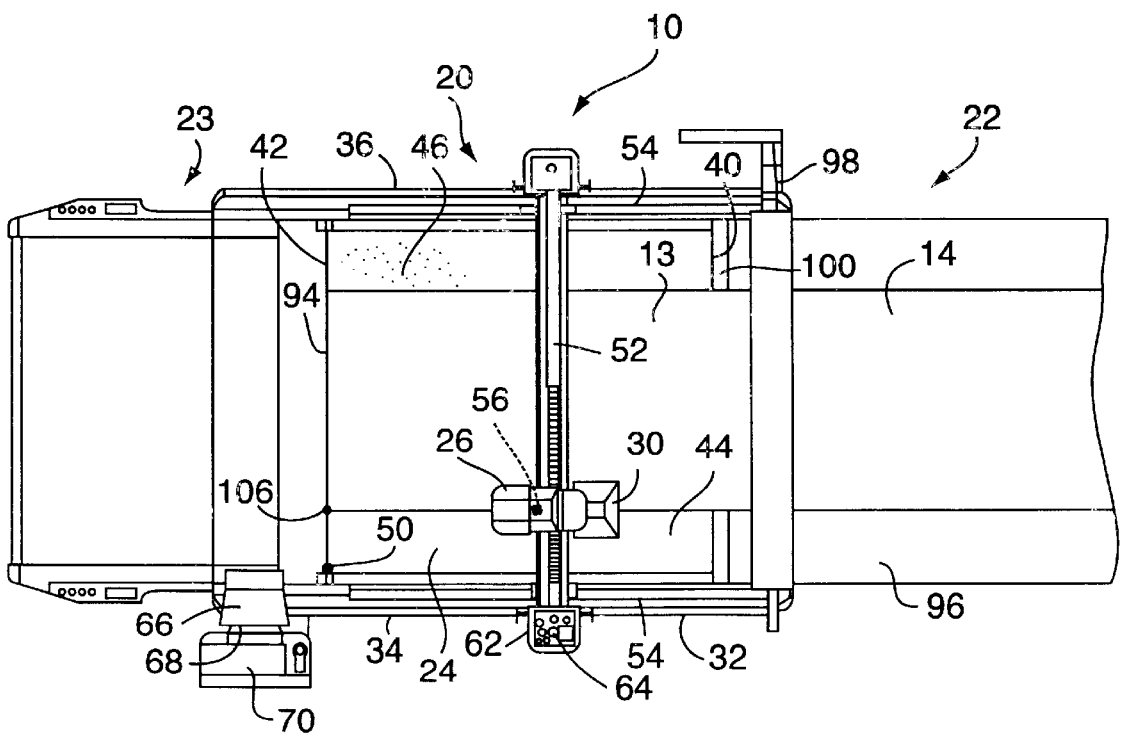
FIG. 5 is a plan view of the apparatus of FIG. 1 with the layup advanced to the take-off end of the cutting table.

Once all the match points that are disposed within the tool offset 60 area are processed, the layup 14 is advanced to the takeoff end 42 of the cutter table 24 with the camera 30 visiting all the matching points, as indicated by P10 and as shown in FIG. 5. Continuing with FIG. 5, the camera is only capable of scanning the layup 14 to a maximum scan position. As the layup advancement is completed, a new and final origin 106 position is automatically established, as indicated by P11. The area defined between the maximum scan position and the new and final origin 106 defines an ancillary area. The ancillary area is an area where cannot be conducted but the present invention allows cutting to take place. The new origin compensates for errors in conveyor belt motion. An encoder (not shown) measures discrepancies between conveyor motion and beam motion. Subsequently, the actual cutting of the parts is started with the cut data file using the new automatically set origin as an origin for the cut instructions.

The apparatus and method of the present invention allow more efficient use of material as a result of increased flexibility in marker layout 74. Additionally, the present invention results in greater usable area of the cutter table 24. One benefit of greater usable area of the cutter table is that larger number of parts 16 can fit thereon and there is a greater chance of matching all parts that need to be matched. Another benefit is that the overall efficiency is increased since fewer layups result in the same number of parts and the layup does not need to be advanced as frequently. For example, in one configuration, the tool offset 60 was seventeen inches (17"). Implementation of the present invention resulted in substantial recovery of the tool offset area.

Another major advantage of the present invention is that the origin 106 is established automatically. Prior art required a great deal of trial and error from the operator with the layup being repeatedly advanced then backed up, frequently disturbing the plies of the material. The present invention eliminates the need for the time consuming and not entirely precise manipulations of the layup.

While the present invention has been illustrated and described with respect to a particular embodiment thereof, it should be appreciated by those of ordinary skill in the art, that various modifications to this invention may be made without departing from the spirit and scope of the present invention. For example, the camera can be attached to the cutter head and move therewith, as shown in FIGS. 2 and 5, or move separately, as shown in FIG. 1.

We claim:

1. A method for evaluating sheet-type work material carried on a cutting table support surface to minimize waste, said method comprising the steps of:

providing a cutting apparatus having a movable support surface adapted to carry at least one layer of sheet-type work material, a camera and cutter head amounted to said cutting apparatus, said camera and said cutter head being movable over said movable support surface and defining an offset distance between a tip of said cutter head and a focal point defined by said camera, said camera movement defining a scanable area and said tip movement defining a cuttable area within the scanable area, the offset distance creating an ancillary area;

presenting said work material to said support surface, a portion of said work material within said scanable area;

selecting an origin point on said portion;

positioning said focal point of said camera over said origin point;

causing said camera to scan at least part of said portion of said work material within said scanable area thereby generating a first set of data;

relocating said moveable support surface and thereby said work material such that at least some of said at least part corresponding with said first set of data is positioned within said ancillary area and additional work material is within said cuttable area;

scanning at least part of the said additional work material within said cuttable area to generate a second data set; and performing a cutting operating in said ancillary area and said cuttable area in accordance with said first and second sets of data.

2. The method according to claim 1 wherein said at least part of said portion and said ancillary area are of equal size.

3. The method of claim 1 wherein said additional work material extends throughout said cuttable area.

4. The method of claim 1 wherein the cutting apparatus further includes a spreading apparatus and a take-off table connected thereto.

5. The method of claim 1 wherein the movements of the support surface, the cutter head, camera and work material are controlled by a computer.

* * * * *

UNITED STATES PATENT AND TRADEMARK OFFICE
CERTIFICATE OF CORRECTION

PATENT NO. : 6,502,489 B2
DATED : January 7, 2003
INVENTOR(S) : Thomas Gerent et al.

It is certified that error appears in the above-identified patent and that said Letters Patent is hereby corrected as shown below:

Column 6,
Line 38, "amounted" should read -- mounted --.

Signed and Sealed this

Eighteenth Day of March, 2003

JAMES E. ROGAN
*Director of the United States Patent and Trademark Office*